US009615560B2

(12) United States Patent
Yin et al.

(10) Patent No.: US 9,615,560 B2
(45) Date of Patent: Apr. 11, 2017

(54) DUAL-BEARING REEL

(71) Applicant: SHIMANO Components (Malaysia) SDN/BHD, Pontian, Johor (MY)

(72) Inventors: Lee Wen Yin, Johor (MY); Gan Lin Boon, Johor (MY); Chew Chun Wee, Johor (MY)

(73) Assignee: SHIMANO COMPONENTS (MALAYSIA) SDN/BHD, Johor (MY)

( * ) Notice: Subject to any disclaimer, the term of this patent is extended or adjusted under 35 U.S.C. 154(b) by 268 days.

(21) Appl. No.: 14/523,766

(22) Filed: Oct. 24, 2014

(65) Prior Publication Data
US 2015/0201599 A1 Jul. 23, 2015

(30) Foreign Application Priority Data

Nov. 14, 2013 (JP) ................................. 2013-235777

(51) Int. Cl.
A01K 89/01 (2006.01)
A01K 89/033 (2006.01)
(52) U.S. Cl.
CPC ............ *A01K 89/033* (2013.01); *A01K 89/05* (2015.05)
(58) Field of Classification Search
CPC .... A01K 89/015; A01K 89/018; A01K 89/02; A01K 89/05; A01K 89/053; A01K 89/055
See application file for complete search history.

(56) References Cited

U.S. PATENT DOCUMENTS

| 4,166,594 | A | * | 9/1979 | Kinsey | A01K 89/015 242/258 |
| 4,522,354 | A | * | 6/1985 | Sato | A01K 89/015 242/299 |
| 4,703,902 | A | * | 11/1987 | Prouza | A01K 89/02 188/71.5 |
| 4,824,046 | A | * | 4/1989 | Emura | A01K 89/015 242/261 |
| 5,110,066 | A | * | 5/1992 | Toda | A01K 89/015 242/255 |
| 5,217,182 | A | * | 6/1993 | Puryear | A01K 89/015 242/321 |
| 5,489,070 | A | * | 2/1996 | Puryear | A01K 89/015 242/261 |

FOREIGN PATENT DOCUMENTS

JP 4451773 B2 2/2010

* cited by examiner

*Primary Examiner* — Emmanuel M Marcelo
(74) *Attorney, Agent, or Firm* — Global IP Counselors, LLP

(57) ABSTRACT

A second one-way clutch for a dual-bearing reel includes a ratchet wheel, a pawl member, and a pawl pivot controller. The ratchet wheel includes a plurality of ratchet teeth disposed in the circumferential direction at intervals of the ratchet wheel. The ratchet wheel is rotatable in conjunction with the drive shaft. The pawl member is pivotally disposed on the pivot shaft between an engagement position in which the pawl member engages the ratchet teeth and an un-engagement position in which the pawl member is un-engagement from the ratchet teeth. The pawl pivot controller is rotatably disposed on the pivot shaft, has an interlocking gear that rotates in response to the rotation of the drive shaft, and pivots the pawl member to the engagement position and the un-engagement position in response to the rotational direction of the interlocking gear.

13 Claims, 6 Drawing Sheets

DUAL-BEARING REEL

CROSS-REFERENCE TO RELATED APPLICATIONS

This application claims priority to Japanese Patent Application No. 2013-235777 filed on Nov. 14, 2013, the entirety of which is hereby incorporated by reference in its entirety.

BACKGROUND OF THE INVENTION

Field of the Invention

The present invention relates to a fishing reel for winding fishing. In particular, the present invention relates to a dual-bearing fishing reel.

Background Art

Normally, when a fish is hooked and is being reeled in with a fishing reel, the fishing line is wound onto a spool by winding a handle, and the fishing reel is configured so that the spool will not rotate in a line delivering direction (a line casting direction) so that the line will not be delivered in the opposite (i.e., non-reeling) direction.

The conventional Dual-bearing reels can include a drag device to prevent the occurrence of problems, such as the line being broken due to excessive tension applied to the line when the fish is pulling on the fishing line.

The conventional Dual-bearing reels can also include a one-way clutch for preventing the rotation of the spool in the line delivering direction to actuate the drag device. For example, in the case of a star drag-type dual-bearing reel in which a drag device is disposed around the drive shaft, a roller-type one-way clutch and/or a pawl-type one-way clutch is mounted on the drive shaft to which the handle is mounted. Additionally, in a lever drag-type dual-bearing reel, in which the drag device is disposed around the spool shaft, the pawl-type one-way clutch is disposed on the spool shaft, the drive shaft, or a drag disc (refer to, for example, U.S. Pat. No. 4,451,773).

The above mentioned conventional pawl-type one-way clutch comprises a ratchet wheel that rotates in conjunction with the drive shaft, and a pawl member for preventing the rotation of the ratchet Wheel in the line delivering direction. The pawl member pivots from a disengaged position that is disengaged with the ratchet wheel and an engagement position that the pawl member engages the ratchet teeth. The conventional one-way clutch comprises a biasing member for pivot control that pivots the pawl member to the engagement position side with friction during line delivering and that pivots the pawl member to the disengaged position side with friction during line winding. Accordingly, the one-way clutch does not produce a sound during line winding. The biasing member for pivot control is formed by a thin, metallic, plate-like member that is bent into a C-shape and that is fitted and fixed to a ratchet pawl. The pair of distal ends of the biasing member is elastically in contact with the side surfaces of the ratchet wheel in order to sandwich the ratchet wheel.

SUMMARY

Conventionally, the biasing member for pivot control that sandwiches the ratchet wheel is formed by a plate-like member, resulting in a biasing member that can be easily deformed. When the biasing member deforms, there is a risk that the frictional force between the biasing member and the ratchet wheel will change. This change is frictional force of the biasing member for pivot control may cause the pawl member to not pivot normally in conjunction with the rotation of the drive shaft.

The object of the present invention is to suppress a change in the frictional force that is generated by the deformation of a member for pivot control.

The dual-bearing reel according to the present invention is a reel to forwardly casting a fishing line. The dual-bearing reel comprises a handle, a reel body, a drive shaft, a ratchet wheel, a pawl member, a spool, and a pawl pivot controller. A pivot shaft is disposed in the reel body, and the handle is disposed to the side of the reel body. The drive shaft is rotatably mounted to the reel body and is rotatable in conjunction with the handle. The ratchet wheel comprises a plurality of ratchet teeth that are disposed at intervals in a circumferential direction thereof. The ratchet wheel is rotatable in conjunction with the drive shaft. The pawl member is pivotally disposed on the pivot shaft between an engagement position in which the pawl member engages the ratchet teeth and a disengaged position in which the pawl member disengages the ratchet teeth. The spool is rotatable with respect to the reel body and can wind the fishing line with the rotation of the drive shaft in the line winding direction R1. The pawl pivot controller is rotatably disposed on the pivot shaft, has a first rotating member that rotates in response to the rotation of the drive shaft, and pivots the pawl member to the engagement position and the disengaged position in response to the rotational direction of the first rotating member.

In this dual-bearing reel, when the drive shaft rotates in the line winding direction, the first rotating member for pivot control of the pawl pivot, controller also rotates in the line winding direction. When the first rotating member rotates in the line winding direction, for example, the pawl member pivots to the disengaged position. Meanwhile, when the drive shaft rotates in the line delivering direction, the first rotating member also rotates in the line delivering direction. When the first rotating member rotates in the line delivering direction, for example, the pawl member pivots to the engagement position. Accordingly, the rotation of the ratchet wheel in the line delivering direction is prevented, and the rotation of the drive shaft in the line delivering direction is also prevented. As a result, the drag mechanism can be operated. In this configuration, the pivoting of the pawl member is controlled, not with a plate-like member, but with the first rotating member that rotates in response to the rotation of the drive shaft; therefore, the deformation of the member for pivot control is less likely to occur, and it is possible to suppress the change in the frictional force that is generated by the deformation.

The pawl pivot controller can further comprise a second rotating member that can rotate in conjunction with the drive shaft. The first rotating member rotates in conjunction with the rotation of the second rotating member. In this configuration, since the rotation of the drive shaft can be transmitted to the first rotating member via, the second rotating member, the first rotating member can be rotated in conjunction with the drive shaft regardless of where the ratchet wheel is disposed in the dual-bearing reel.

The second rotating member can be disposed on the drive shaft. When the ratchet wheel is disposed on the drive shaft, the rotation of the drive shaft can be easily transmitted to the first rotating member. Additionally, the first rotating member can be disposed without being limited by the size or the positional relationship of the ratchet wheel and the drive gear that transmits the rotation of the drive shaft to the spool.

The second rotating member can be a drive gear that is disposed on the drive shaft for transmitting the rotation of the handle to the spool. In this configuration, since the second rotating member for transmitting the rotation of the drive shaft to the first rotating member can also be used as the drive gear, it is possible to simplify the configuration of the pawl pivot controller.

The pawl pivot controller can further comprise a biasing member that biases the pawl member to the engagement position and the disengaged position according to the rotational direction of the first rotating member. In this configuration, the first rotating member does not directly control pivoting of the pawl member, but the first rotating member controls the pivot of the pawl member via the biasing member; therefore, the pivoting of the pawl member can be accurately controlled.

The biasing member can comprise a friction engagement portion that frictionally engages the first rotating member and a pivoting part that can integrally pivot the pawl member. In this configuration, since the biasing member comprises a friction engagement portion and a pivoting part, the pivoting of the pawl member can be more accurately controlled with the biasing member.

The first rotating member can comprise a cylindrical portion that is disposed around the pivot shaft in a cylindrical shape and to which the pawl member is pivotally mounted. In this configuration, since the pawl member is mounted to the pivot shaft via the first rotating member, the contact surface between the pawl member and the first rotating member is large, and the pawl member can be easily pivoted according to the rotation of the first rotating member.

The friction engagement portion of the biasing member can comprise an arcuate part that is frictionally engaged with and mounted to the cylindrical portion; the pivoting part of the biasing member can comprise an extended section that extends from the end of the arcuate part to the pawl member. In this configuration, frictional engagement between the arcuate part and the first rotating member can occur, and the pivoting of the pawl member can be controlled with the extended section.

The cylindrical portion can comprise a retaining recess that retains the biasing member in the circumference of the cylindrical portion. In this configuration, since the biasing member can be retained in the retaining recess of the first rotating member, the biasing member can be easily pivoted according to the rotation of the first rotating member.

The pawl pivot controller further comprises an engagement member that is integrally and pivotally disposed on the pawl member and that engages the extended section. In this configuration, since the pawl member can pivot with the extended section of the biasing member via the engagement member, the pawl member can be more reliably pivoted in response to the rotation of the first rotating member.

The engagement member can comprise a mounting portion that can be mounted to the pivot shaft, an engagement portion that integrally and pivotally engages the pawl member, and an engagement groove that engages the extended section. In this case, since the engagement portion engages the pawl member, and since the extended section of the biasing member engages the engagement groove, the pivoting of the biasing member can be reliably transmitted to the pawl member.

The mounting portion can be mounted on the outer peripheral side of the arcuate part in the cylindrical portion, and the engagement portion can extend along the pawl member from the mounting portion and comprise a pair of engagement pieces that engage both side surfaces of the pawl member. The engagement groove is formed on the engagement portion along the pawl member, and an extended section is disposed therein. In this configuration, since the pawl member is sandwiched by the engagement pieces and the extended section is disposed in the engagement groove, when the extended section is pivoted, the engagement member will pivot via the engagement groove and, additionally, the pawl member will pivot via the engagement portion. Accordingly, the pawl member can be more reliably pivoted with the pivoting of the biasing member.

The first rotating member can be a gear member that meshes with the drive gear. In this case, since the first rotating member is a gear member, the first rotating member will not slide with respect to the drive gear and will instantaneously interlock with respect to the rotation of the drive gear.

According to the present invention, the pivoting of the pawl member is controlled, not with a plate-like member, but with the first rotating member that rotates in response to the rotation of the drive shaft; therefore, deformation of the member for pivot control is less likely to occur, and a change in the frictional force that is generated by the deformation can be suppressed.

BRIEF DESCRIPTION OF TUE DRAWINGS

Referring now to the attached drawings which form a part of this original disclosure:

DETAILED DESCRIPTION OF THE EMBODIMENTS

Figure 1:
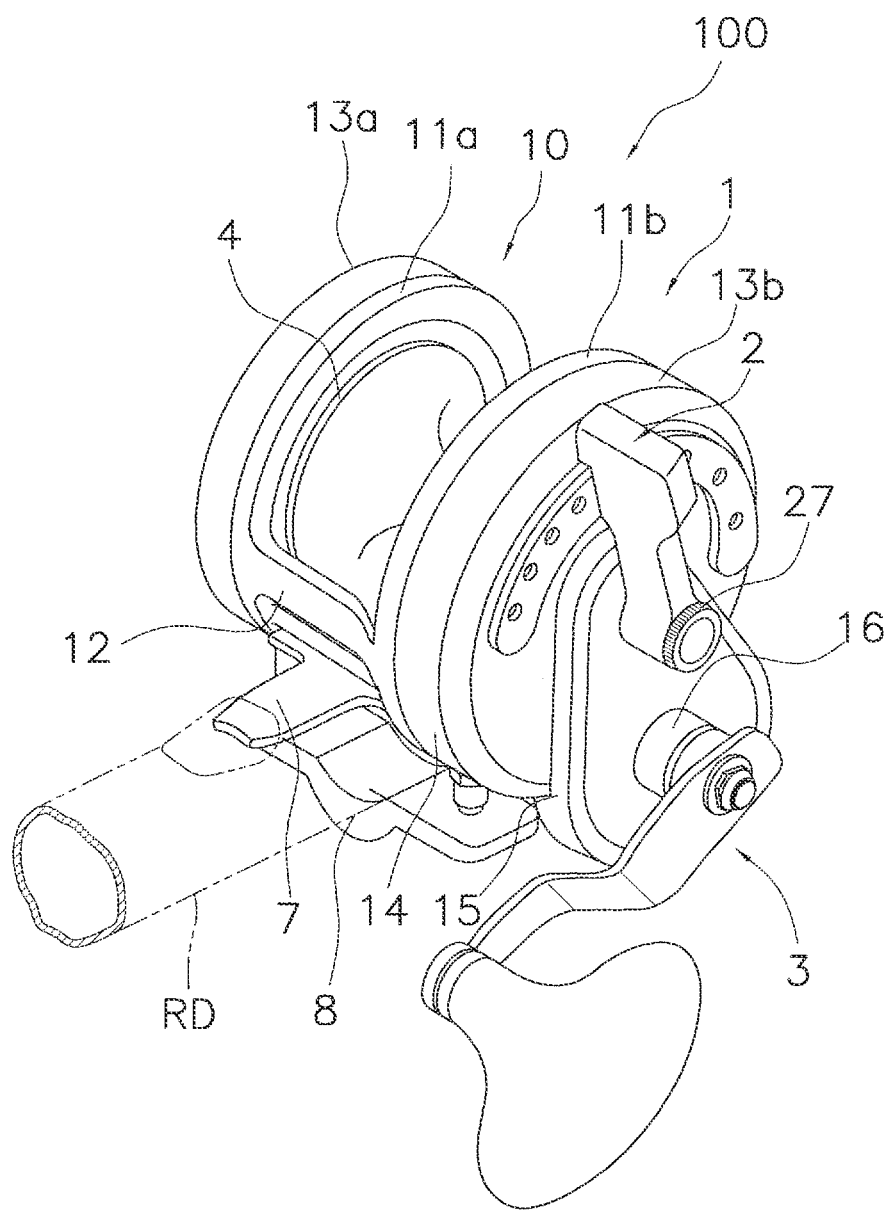
FIG. 1 is a cross-sectional view of a dual-bearing reel according to a first embodiment of the present invention.
Figure 2:
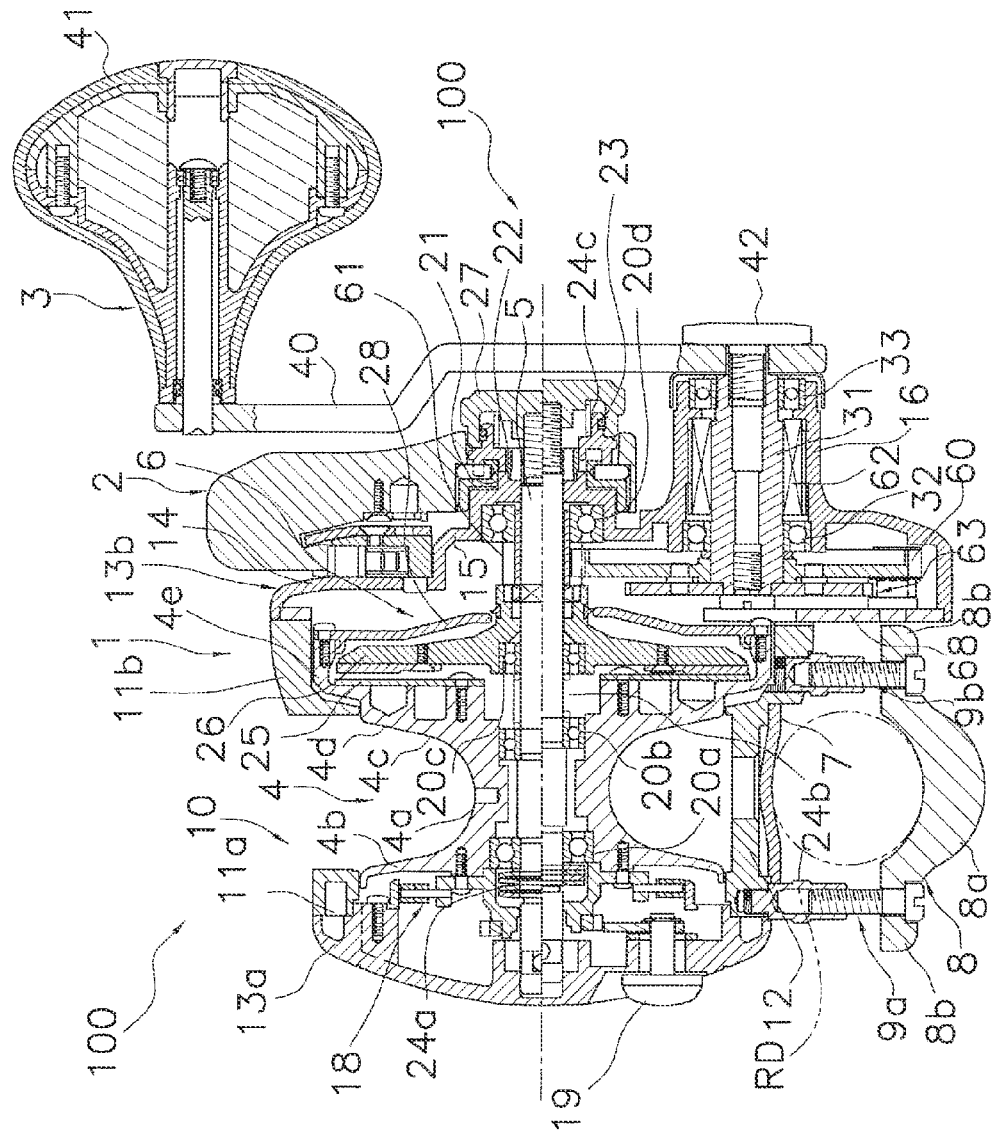
FIG. 2 is a cross-sectional view of the dual-bearing reel.
Figure 3:
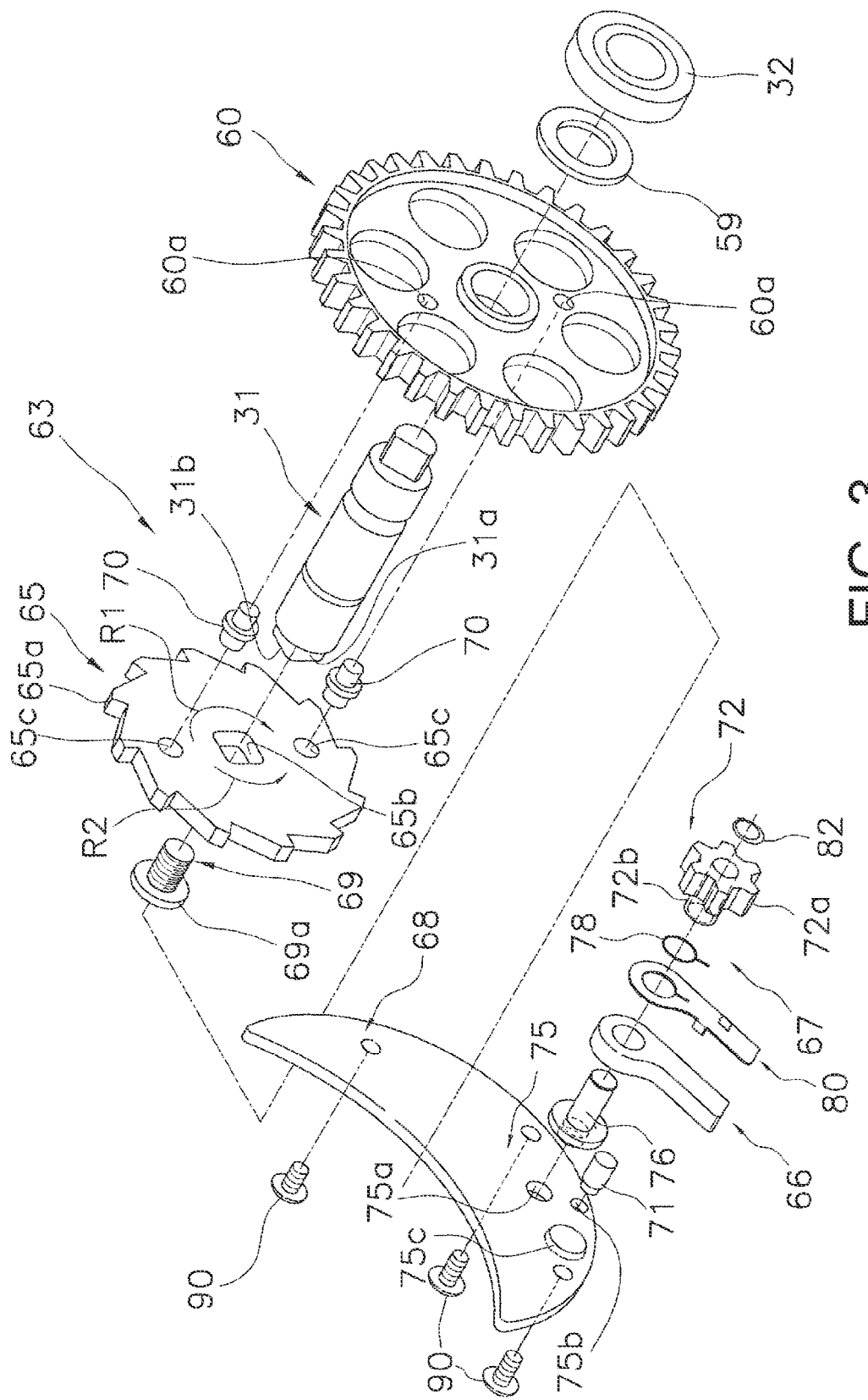
FIG. 3 is an exploded perspective view of a second one-way clutch.

As shown in FIG. 1 and FIG. 2, the dual-bearing reel 100 according to a first embodiment of the present invention is a lever drag type that can cast (deliver) the fishing line in a forward direction. The dual-bearing reel 100 comprises a handle 3, a reel body 1 having a pivot shaft 76 (refer to FIG. 3), a drive shaft 31, a second one-way clutch 63, and a spool 4. The second one-way clutch 63, as shown in FIG. 3, comprises a ratchet wheel 65, a pawl member 66, and a pawl pivot controller 67 for pivot control of the pawl member 66.

<Configuration of the Handle and the Reel Body>

As shown in FIG. 1 and FIG. 2, the reel body 1 comprises a frame 10, as well as a first side cover 13a and a second side cover 13b that cover both sides of the frame 10. The frame 10 comprises a pair of left and right side plates (e.g., first side 11a and second side plate 11b) and a plurality of connecting portions 12 that couple the first side plate 11a and the second side plate 11b. Also, as shown in FIG. 3, the reel body 1 comprises a pawl support portion 68 for supporting the pawl member 66 of the second one-way clutch 63. As shown in FIG. 1 and FIG. 2, the first side plate 11a and the second side plate 11b are roughly circular members from the side view, and the diameter of the second side plate 11b is larger than the diameter of the first side plate 11a. The plurality of connecting portions 12 are integrally formed with the first side plate 11a and second side plate 11b; a longitudinal, metallic rod mounting leg portion 7 for mounting the reel to the fishing rod RD is fixed to the connecting portion 12 on the lower side.

A rod clamp 8 that sandwiches the fishing rod RD is disposed to face the rod mounting leg portion 7. The rod clamp 8 is made of metal and comprises a pair of attaching portions 8b that extend from both sides of the arcuate part 8a. The rod clamp 8 is fixed to a connecting portion 12 that is lower than first and second fasteners 9a and 9b while sandwiching the fishing rod RD.

The first side cover 13a is a roughly circular member from the side view that is mounted to the side of the first side plate 11a. The second side cover 13b comprises a tubular portion 14 that is mounted to the side of the second side plate 11b and a bulging portion 15 that protrudes axially outward (from the right side in FIG. 2) of the tubular portion 14. The first side cover 13a and the tubular portion 14 are both roughly circular members from the side view, with substantially the same diameters as the first and second side plates 11a and 11b, and the diameter of the second side cover 13b is larger than the diameter of the first side cover 13a.

The tubular portion 14 is a roughly circular member from the side view that is mounted to the side of the second side plate 11b. The bulging portion 15 is integrally formed with the tubular portion 14 and is formed protruding axially outward (from the right side in FIG. 2) so that there is a space inside that communicates with the tubular portion 14. The bulging portion 15 is a roughly raindrop-shaped member from the side view, having a small arcuate part and a large arcuate part, and is formed so that the large arcuate part on the bottom protrudes downward from the tubular portion 14. The bulging portion 15 is mounted so that a drag operating member 2 and the handle 3 are exposed outside of the reel body 1.

As shown in FIG. 2, a protruding tube 16 for mounting the drive shaft 31 is formed protruding outwardly, below the drag operating member 2 of the bulging portion 15. A tubular drive shaft 31 is disposed parallel to a spool shaft 5, which is the rotating shaft of the spool 4, inside of the protruding tube 16.

As shown in FIG. 3, the pawl support portion 68 comprises a fixing bracket 75 that is fixed to the bulging portion 15 and a pivot shaft 76 for pivotally supporting the pawl member 66. The fixing bracket 75 is fixed to the inside surface of the bulging portion 15 of the second side plate 13b, sandwiching the ratchet wheel 65 of the second one-way clutch 63 by, for example, a screw member 90. The pivot shaft 76 is mounted to the fixing bracket 75 and pivotally supports the pawl member 66. The fixing bracket 75 is formed in a crescent shape to expose the head portion 69a of a stopper bolt 69 for stopping the ratchet wheel 65, as discussed below. Accordingly, the stopper bolt 69 can be fastened after fixing the fixing bracket 75 to the bulging portion 15. A first fixing hole 75a for caulking the pivot shaft 76 and a second fixing hole 75b for caulking a regulating pin 71 that regulates the pivoting of the pawl member 66 are formed on the fixing bracket 75. Additionally, a deflection prevention projection 75c for preventing the deflection of the pawl member 66 to the fixing bracket 75 side is formed protruding toward the pawl member 66.

Figure 5:
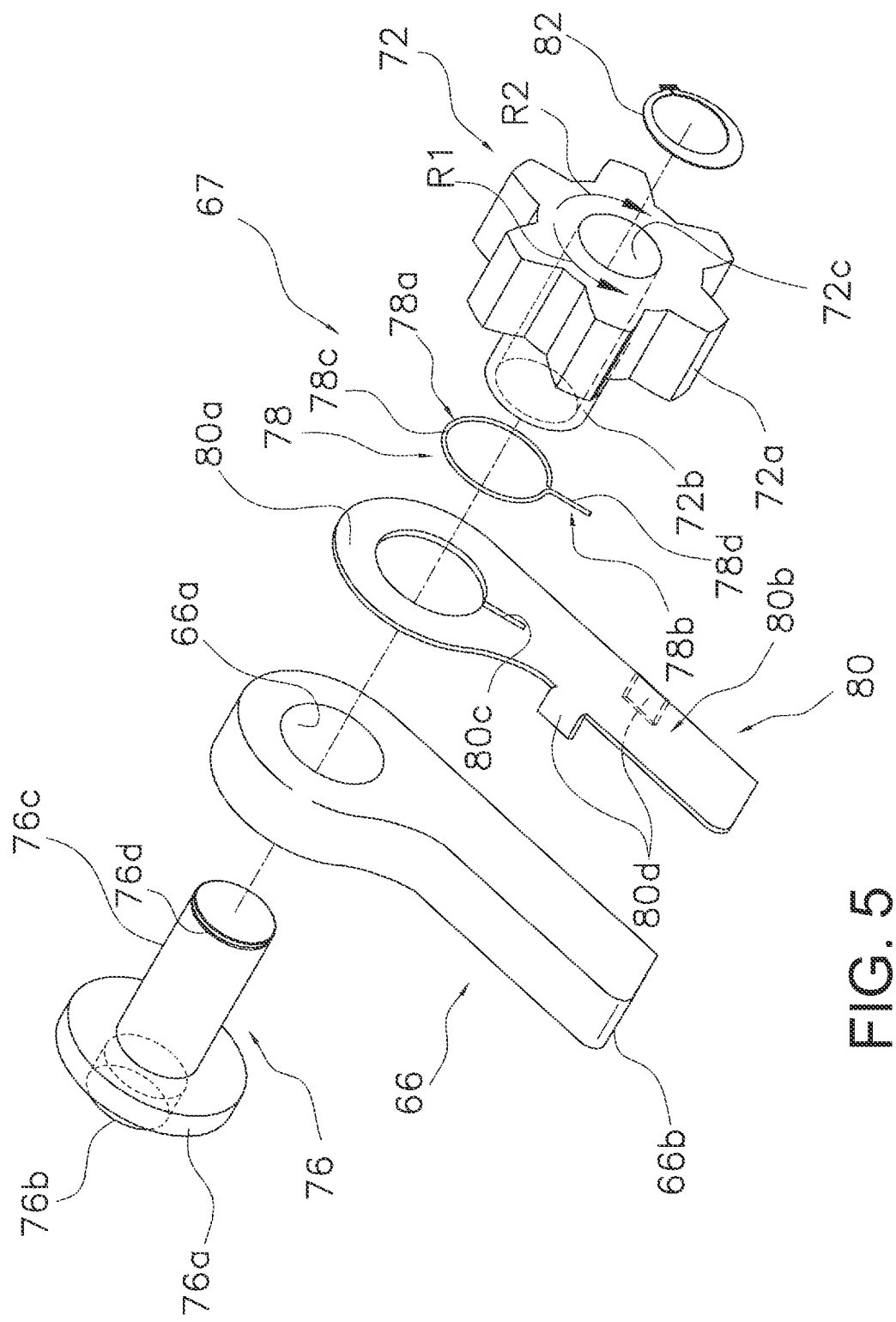
FIG. 5 is an exploded perspective view of the pawl pivot controller.
Figure 6:
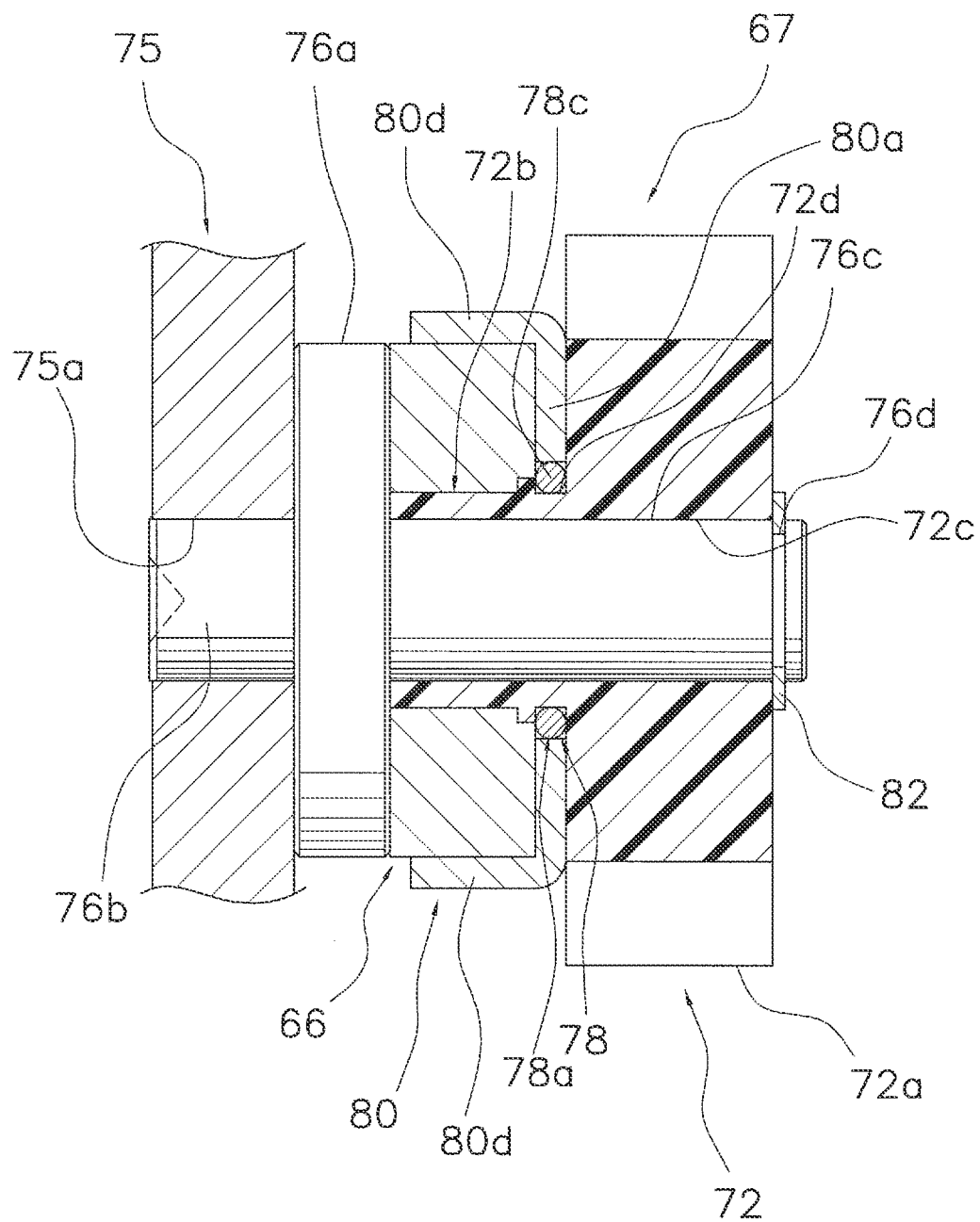
FIG. 6 is a cross-sectional view of the pawl pivot controller taken along the sectional line VI-VI in FIG. 4.

The pivot shaft 76 is, for example, a pin member made of metal, such as aluminum or stainless steel. As shown in FIG. 5 and FIG. 6, the pivot shaft 76 comprises a large-diameter flange portion 76a, a caulked portion 76b caulked and fixed to the fixing bracket 75, and a pivot support portion 76c disposed on the opposite side of the caulked portion 76b and sandwiching the flange portion 76a. An interlocking gear 72 discussed below is rotatably mounted to the pivot support portion 76c of the pivot shaft 76. The interlocking gear, is a first rotating member, and a pawl member 66 is pivotally supported by the pivot support portion 76c of the pivot shaft 76 via the interlocking gear 72.

As shown in FIG. 2, the handle 3 is integrally and rotatably coupled with the other end of the drive shaft 31. The handle 3 comprises a handle arm. 40 that is coupled to the distal end of the drive shaft 31 and a handle grip 41 that is rotatably supported by the distal end of the handle arm 40. The handle arm 40 is coupled to the distal end of the drive shaft 31, integrally and rotatably with respect to the drive shaft 31, by a screw member 42. The handle grip 41 is formed to be roughly T-shaped with a rounded outline so that this grip can be easily gripped with force. The handle 3 of the present embodiment is a single-handle type with one handle grip 41. Meanwhile, the handle can be a double handle type in which the handle grips are mounted to both ends of the handle arm.

<Configuration of the Drive Shaft>

As shown in FIG. 2 and FIG. 3, the drive shaft 31 is rotatably cantilevered to the protruding tube 16 by two axle bearings 32 and 33 that are disposed on respective ends of the protruding tube 16; one shaft end is disposed protruding further inward of the axle bearing 32. A drive gear 60 is rotatably mounted to the protrusion on the axle bearing 32 side of the drive shaft 31. The drive gear. 60 is one example of a second rotating member. As shown in FIG. 3, a pair of rotational transmission holes 60a is formed in the disk portion of the drive gear 60. The drive gear 60 is in contact with the axle bearing 32 via a washer 59. The handle 3 is non-rotatably mounted to the other shaft end of the drive shaft 31. A rotation engagement portion 31a, which is formed to have a non-circular cross section, such as a rectangular-shaped cross section, is formed on the shaft end portion 31b of the drive shaft 31 on the axle bearing 32 side. As shown in FIG. 2, a roller-type first one-way clutch 62 is disposed between the axle bearings 32 and 33. The first one-way clutch 62 allows only the forward rotation of the drive shaft 31 in the line winding direction R1 and prevents the reverse rotation in the line delivering direction R2. The drive gear 60 rotates the spool 4 in response to the rotation of the handle 3 in the line winding direction R1. The drive gear 60 meshes with a pinion gear 61 rotatably mounted around the spool shaft 5.

<Configuration of the Second One-Way Clutch>

Figure 4:
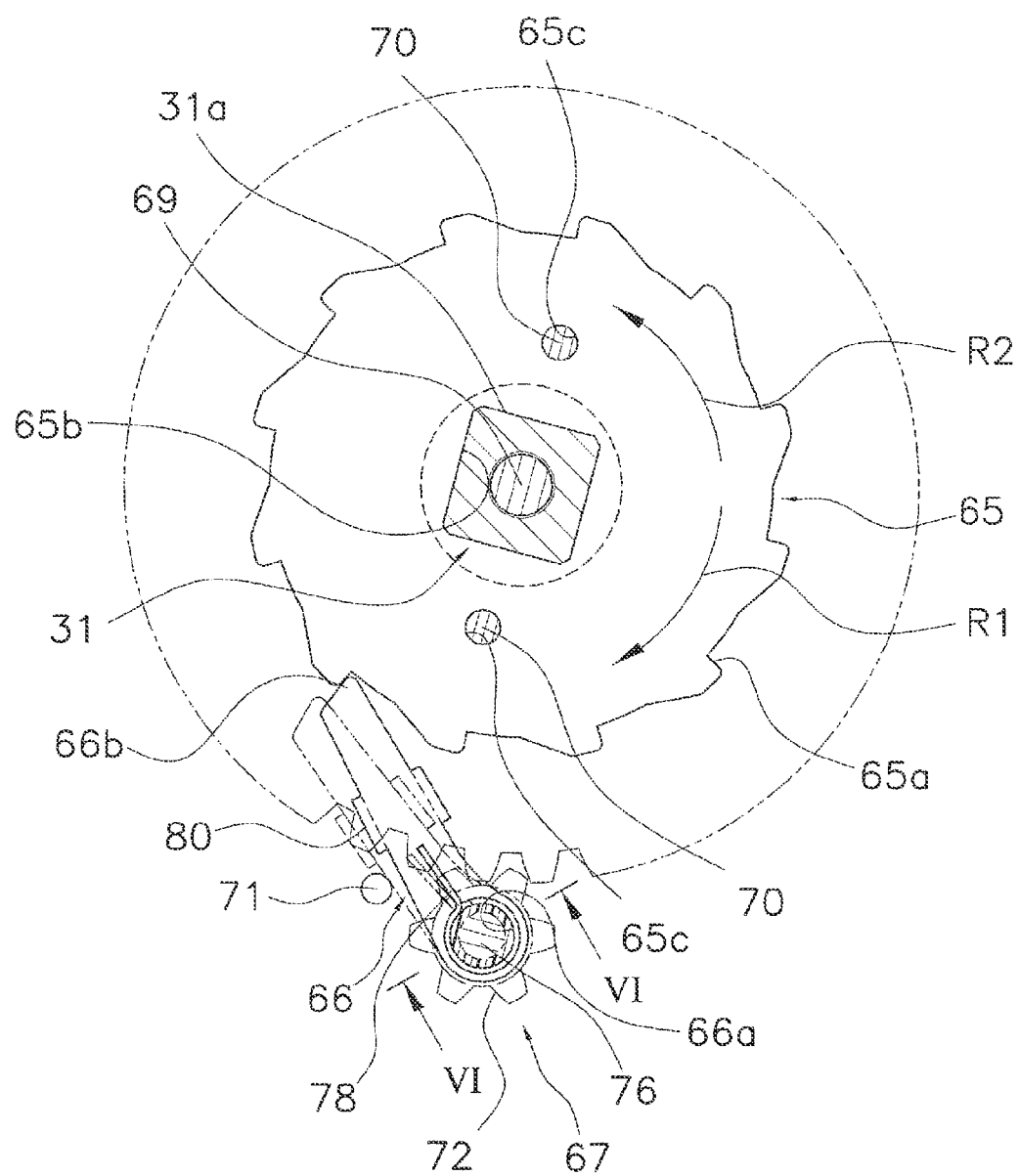
FIG. 4 is a frontal view of the second one-way clutch.

As shown in FIG. 3 and FIG. 4, the second one-way clutch 63 is a pawl type disposed on one shaft end of the drive shaft 31. The second one-way clutch 63 is for preventing the reverse rotation of the drive shaft 31 in the same way as the first one-way clutch 62. The first one-way clutch 62 and the second one-way clutch 63 are used mainly to operate a drag mechanism 6 that applies brakes to the rotation of the spool 4 in the line delivering direction R7. With the first one-way clutch 62, the switching time of the reverse rotation prevention operation is fast, but the allowable transmission force is small. With the second one-way clutch 63, the switching time is slow, but the allowable transmission force is large.

The second one-way clutch 63, as shown in FIG. 3, comprises a ratchet wheel 65, a pawl member 66, and a pawl pivot controller 67 that controls the pivoting of the pawl member 66. The ratchet wheel 65 is disposed side-by-side in the rotation engagement portion 31a of the drive shaft 31 at intervals so that this wheel interlocks with the drive gear 60. The pawl member 66 is disposed on the outer peripheral side of the ratchet Wheel 65. The pawl pivot controller 67 controls the pivoting of the pawl member 66 according to the rotational direction of the drive shaft 31.

<Configuration of the Ratchet Wheel>

The ratchet wheel 65 is a member made of metal, such as stainless steel or aluminum. The ratchet wheel 65 comprises a plurality of saw tooth-shaped ratchet teeth 65*a* that are disposed at intervals in the circumferential direction of the outer peripheral part of the ratchet wheel 65. The ratchet wheel 65 is a roughly disk-shaped member that is smaller in diameter than the drive gear 60, and includes a rectangular mounting hole 65*h*, which integrally and rotatably engages the rotation engagement portion 31*a* of the drive shaft 31, formed in the center portion thereof. A pair of rotation transmission holes 65*c* are formed in the disk portion of the ratchet wheel 65 and extend through both side surfaces in a position that can face the rotation transmission hole 60*a* of the drive gear 60. A coupling pin 70 that couples the two rotation transmission holes 60*a* and 65*c* is disposed between the drive gear 60 and the ratchet wheel 65 and is inserted in both of the rotation transmission holes 60*a* and 65*c*. With this configuration, the rotation of the ratchet wheel 65, that is, the rotation of the drive shaft 31, is transmitted to the drive gear 60 via the coupling pin 70. The ratchet wheel 65 is stopped by a stopper bolt 69 that is screwed into the shaft end portion 31*b* of the drive shaft 31 and is integrally and rotatably mounted to the drive shaft 31. The stopper bolt 69 presses the drive gear 60 via the ratchet wheel 65, and the drive gear 60 is in contact with the inner ring of the axle bearing 32 via the washer 59. Accordingly, the drive gear 60 is positioned relative to the drive shaft 31 in the axial direction by the stopper bolt 69.

<Configuration of the Pawl Member>

The pawl member 66 is a member made of metal, such as stainless steel or aluminum. As shown in FIG. 4, the pawl member 66 is pivotal about the pivot shall 76 between an engagement position shown by the solid lines, where the distal end portion 66*b* makes contact and engages with the ratchet teeth 65*a*, and a disengaged position, as shown by the chain double-dashed line where the distal end portion 66*b* is disengaged from the ratchet teeth 65*a*. When the pawl member 66 is disposed in the engagement position, the rotation of the drive shaft 31 in the line delivering direction R2 is prevented. Therefore, when the spool 4 is rotated in the line delivering direction R2, the drag mechanism 6 mentioned below is activated. As shown in FIG. 5 and FIG. 6, the pawl member 66 comprises a support hole 66*a* that is fitted to a cylindrical portion 72*b* of the interlocking gear 72 mentioned below. The distal end portion 66*b* of the pawl member 66 that extends from the support hole 66*a* in the radial direction is disposed further on the downstream side of the ratchet wheel 65 in the line winding direction R1 than the support hole 66*a*. The pawl member 66 is regulated by the regulating pin 71 in order to not separate from the ratchet wheel 65 further than the disengaged position.

<Configuration of the Pawl Pivot Controller>

As shown in FIG. 5 and FIG. 6, the pawl pivot controller 67 comprises an interlocking gear 72, a drive gear 60, a biasing member 78, and a pawl cover 80. The interlocking gear 72 is one example of a first rotating member. The drive gear 60 is capable of transmitting the rotation of the handle 3 to the spool 4, as well as rotating in conjunction with the drive shaft 31 as the second rotating member of the pawl pivot controller 67.

The interlocking gear 72 is a member made of synthetic resin, such as polyacetal resin or polyamide resin. However, the interlocking gear 72 can also be metallic. The interlocking gear 72 is rotatably supported by the pivot shaft 76. The interlocking gear 72 comprises a gear portion 72*a* that meshes with the drive gear 60 and a cylindrical portion 72*b* that is formed to be smaller in diameter than the gear portion 72*a*. A pawl member 66 is pivotally mounted to the outer peripheral surface of the cylindrical portion 72*b*. The axial length of the cylindrical portion 72*b* is the same as or is slightly shorter than the length obtained by adding the thickness of the pawl member 66 and the thickness of the pawl cover 80. An annular retaining recess 72*d* (refer to FIG. 6) for mounting a frictional engagement portion 78*a* of the biasing member 78, as discussed below, is formed on the outer peripheral surface of the cylindrical portion 72*b* on the gear portion 72*a* side. The bottom of the retaining recess 72*d* is disposed in essentially the same radial position as the outer peripheral surface of the cylindrical portion 72*b*. A support hole 72*c* extends through the gear portion 72*a* and the cylindrical portion 72*b* is formed on the inner peripheral part of the interlocking gear 72. The pivot support portion 76*c* of the pivot shaft 76 is fitted into the support hole 72*c*.

The interlocking gear 72 is stopped along with the pawl member 66 with respect to the pivot support portion 76*c* by a stopper member 82 that is mounted to the distal end of the pivot support portion 76*c* of the pivot shaft 76. A retaining ring, such as a C-type retaining ring or an E-type retaining ring, can be used as the stopper member 82. Additionally, a screw member such as a bolt can be used as the stopper member, and the screw member can be screwed to the distal end surface of the pivot support portion 76*c* for stopping. The stopper member 82 is mounted to an annual groove 76*d* that is formed on the distal end of the pivot support portion 76*c*. By stopping the interlocking gear 72 with the stopper member 82, contact between the biasing member 78 and the interlocking gear 72 can be ensured, and the biasing member 78 can be pivoted in response to the rotation of the interlocking gear 72.

The biasing member 78 is a member that is formed by curving and bending a metallic spring steel wire, for example. The biasing member 78 comprises a frictional engagement portion 78*a* that frictionally engages the interlocking gear 72 and a pivoting part 78*b* that can integrally pivot the pawl member 66. The frictional engagement portion 78*a* comprises an arcuate part 78*c* that is mounted to the retaining recess 72*d* of the cylindrical portion 72*b* of the interlocking gear 72 by frictional engagement. The arcuate part 78*c* is curved in a roughly circular shape from the pivoting part 78*b* to a position near the pivoting part 78*b* along the line delivering direction R2. The pivoting part 78*b* comprises an extended section 78*d* that extends from the end of the arcuate part 78*c* to the pawl member 66. The extended section 78*d* extends radially outward of the arcuate part 78*c*. If the biasing member 78 is configured in this manner, when the interlocking gear 72 is rotated in the line winding direction R1, the arcuate part 78*c* is elastically deformed in the direction in which the inner diameter expands; when the interlocking gear 72 is rotated in the line delivering direction R2, the arcuate part 78*c* is elastically deformed in the direction in which the inner diameter will contract and will tightly make contact with the retaining recess 72*d* of the interlocking gear 72 and increase the frictional force. Accordingly, when the interlocking gear 72 is rotated in the line delivering direction R2, the biasing member 78 will follow the interlocking gear 72 and will quickly pivot to the engagement position side.

The pawl cover 80 is integrally and pivotally disposed on the pawl member 66 and engages the extended section 78*d*. The pawl cover 80 transmits the pivoting of the biasing member 78 corresponding to the rotational direction of the interlocking gear 72 to the pawl member 66. The pawl cover 80 is one example of an engagement member. The pawl cover 80 comprises a mounting portion 80a that is pivotal by the pivot shaft 76, an engagement portion 80b that integrally and pivotally engages with the pawl member 66, and an engagement groove 80c that engages with the extended section 78d. The mounting portion 80a is mounted on the outer peripheral side of the arcuate part 78c of the biasing member 78 in the cylindrical portion 72b. The engagement portion 80b extends from the mounting portion 80a along the pawl member 66. The engagement portion 80b comprises a pair of engagement pieces 80d that engage with the side surfaces of the pawl member 66. The engagement groove 80c is formed to the engagement portion 80b along the pawl member 66. The extended section 78d of the biasing member 78 is disposed in the engagement groove 80c.

In the second one-way clutch 63 configured in this manner, when the drive shaft 31 is rotated in the line winding direction R1, which is clockwise in FIG. 4, with the rotation of the handle 3 in the line winding direction, the interlocking gear 72 is rotated in the line winding direction R1, which is counterclockwise in FIG. 5. The biasing member 78 that is frictionally engaged with the interlocking gear 72 pivots counterclockwise in FIG. 5 with the rotation of the interlocking gear 72 in the line winding direction R1 and pivots the pawl member 66 counterclockwise in FIG. 5 via the pawl cover 80. Accordingly, the pawl member 66 pivots from the engagement position toward the disengaged position. When the pawl member 66 is in contact with the regulating pin 71, the pawl member 66 comes to a rest in the disengaged position in a state of being biased in a direction away from the engagement position by the biasing member 78. As a result, the pawl member 66 will not collide with the ratchet wheel 65 at the time of line winding, and noise from the second one-way clutch 63 can be reduced.

When the pull of the prey that is hooked to the tackle is strong and the drive shaft 31 is rotated in the line delivering direction R2, which is counterclockwise in FIG. 4, the interlocking gear 72 is rotated in the line delivering direction R2, which is clockwise in FIG. 5. The biasing member 78 that is frictionally engaged with the interlocking gear 72 pivots clockwise in FIG. 5 with the rotation of the interlocking gear 72 in the line delivering direction R2 and pivots the pawl member 66 clockwise in FIG. 5 via the pawl cover 80. Thus, the pawl member 66 pivots from the disengaged position to the engagement position. As a result, the pawl member 66 is in contact with the ratchet wheel 65 at the time of line delivering, and the second one-way clutch 63 prevents the reverse rotation of the drive shaft 31 in the line delivering direction. Accordingly, the drag mechanism 6 is actuated, and the rotation of the spool 4 in the line delivering direction is stopped. Here, in the pawl pivot controller 67 that is provided to the second one-way clutch 63, the pivoting of the pawl member 66 is controlled, not with a plate-like member, but with the interlocking gear 72 that rotates in response to the rotation of the drive shaft 31; therefore, deformation of the interlocking gear 72 for pivot control is less likely to occur, and it is possible to suppress a change in the frictional force that is generated by the deformation.

<Configuration of the Spool>

As shown in FIG. 2, the spool 4 comprises a tubular line winding cylinder part 4a, as well as a first flange portion 4b and a second flange portion 4c that are formed on the sides of the line winding cylinder part 4a and that are larger in diameter than the line winding cylinder part 4a. The spool 4 is rotatably supported by the spool shaft 5 by axle bearings 20a and 20b. Additionally, a drag mechanism 6 that applies brakes to the rotation of the spool 4 in the line delivering direction R2 is disposed on the handle 3 side of the spool 4. A centrifugal brake mechanism 18 that applies brakes to the spool 4 is also disposed on the first side cover 13a side of the spool 4. The centrifugal brake mechanism 18 prevents line slack on the spool 4 that is generated by an excessive rotation of the spool 4, so-called backlash. A spool sounding mechanism 19 is also disposed between the spool 4 and the first side cover 13a. The spool sounding mechanism 19 can be switched between a sounding state in which this mechanism makes a sound according to the rotation of the spool 4 and a silent state in which no sound is made.

As shown in FIG. 2, the second flange portion 4c is formed to be larger in diameter than the first flange portion 4b. The second flange portion 4c comprises a cylindrical small-diameter portion 4d that is formed so that the line winding cylinder part 4a side is smaller in diameter than a first braking member 25 that configures the drag mechanism 6, as discussed below, and a cylindrical large-diameter portion 4e that is formed so that the outermost peripheral side is larger in diameter than the first braking member 25. The small-diameter portion 4d is integrally formed with the large-diameter portion 4e in order to be smaller in diameter than the large-diameter portion 4e and is disposed to generate a difference in level between the large-diameter portion 4e and the end of the line winding cylinder part 4a. Here, fishing line is wound on the outer periphery of the line winding cylinder part 4a, and winding the fishing line onto the outermost diameter of the small-diameter portion 4d due to the step of the small-diameter portion 4d is possible. Additionally, the second side plate 11b is disposed to cover the area between the large-diameter portion 4e and the small-diameter portion 4d, and the distal end portion extends radially inward to be adjacent the small-diameter portion 4d. For this reason, it is possible to prevent the fishing line from being wound on the outer periphery beyond the small-diameter portion 4d, and to restrict the fishing line from moving axially outward.

<Configuration of the Drag Mechanism>

As shown in FIG. 2, the drag mechanism 6 is configured to change and adjust the braking force that is applied to the rotation of the spool 4, which is mounted to the spool shaft 5, in the line delivering direction R2. The drag mechanism 6 comprises a drag operating member 2; a first cam member 21 that is disposed on the inner peripheral part of the drag operating member 2; a second cam member 22 that is disposed so as to contact the first cam member 21; a drag adjustment member 27 that is mounted so as to be rotatable relative to the second cam member 22 and pull the spool shaft 5 outwards (the right side in FIG. 2); a stopper member 23 that stops the drag adjustment member 27 in the axial direction with respect to the second cam member 22; a first biasing member 24a (refer to FIG. 2) that biases the spool. 4 axially inward and is made of, for example, four disc springs; a second biasing member 24b that is made of coil springs; a third biasing member 24c that biases the drag adjustment member 27 axially outward (the right side in FIG. 2) and is made of coil springs; a first braking member 25 that is fixed radially outward (the right side in FIG. 2) of the spool 4; and a second braking member 26 to which the first braking member 25 is disposed to contact. Further, in the drag adjustment member 27 shown in FIG. 2, the upper half of the spool shaft 5 shows the axial position during the maximum drag operation, and the lower half shows the drag force decreasing position.

The drag adjustment member 27 is a tubular cap member having a bottom and is an adjustment member for initializing the drag force. The drag adjustment member 27 is a member that is mounted so as to be rotatable relative to the second cam member 22, to which the end of the spool Shaft 5 that protrudes outward from the second side cover 13b is screwed, and that puns the spool shaft 5 axially outward (the right side in FIG. 2) with the rotation in the screwing direction. A female threaded portion is formed on the inner peripheral part of the drag adjustment member 27, to which a male threaded portion that is formed on the end of the spool shaft 5 is screwed. A third biasing member 24c made of coil springs is mounted between the inner peripheral part of the drag adjustment member 27 and the axial end surface of the inner peripheral part of the second cam member 22, which constantly biases the drag adjustment member 27 outward. Accordingly, the rattling of the second cam member 22 can be prevented.

As shown in FIG. 2, the spool shaft 5 is a shaft member that is supported by the reel body 1 in order to be axially movable and relatively non-rotatable. Axle bearings 20a and 20b for rotatably mounting the spool 4 and an axle bearing 20c for rotatably supporting the second braking member 26, as discussed below, are mounted to the outer periphery of the spool shaft 5. As shown in FIG. 2, a second biasing member 24b made of coil springs and that biases the spool 4 axially inward (the left side in FIG. 2) is mounted to the outer periphery of the spool shaft 5 between the axle bearings 20a and 20b. Additionally, as shown in FIG. 2, a first biasing member 24a made of disc springs and that biases the spool 4 axially inward (the left side in FIG. 2) is mounted to the outer periphery of the spool shaft 5 that is axially inward (the left side in FIG. 2) of the axle bearing 20a. The biasing force of the first biasing member 24a is stronger than that of the second biasing member 24b. For this reason, the configuration is such that, if the spool shaft 5 moves in the axial direction, first the first biasing member 24a acts, and then the second biasing member 24b acts.

An axle bearing 20d is also mounted to the inner peripheral part of the second side cover 13b and supports the outer peripheral part of a pinion gear 61 that is mounted to the outer periphery of the spool shaft 5. The pinion gear 61 meshes with a drive gear 60 that is integrally and rotatably coupled with the drive shaft 31. The distal end portion of the pinion gear 61 is integrally and rotatably coupled with the inner peripheral side of a second braking member 26, as discussed below. As a result, the rotation from the handle 3 is transmitted to the first braking member 25 via the drive gear 60, the pinion gear 61, and the second braking member 26 and is transmitted from the first braking member 25 to the spool 4; then, the spool 4 rotates.

As shown in FIG. 2, the first braking member 25 is an annular member that is integrally and rotatably coupled with the axially outward (the right side in FIG. 2) part of the spool 4, inside of the second side plate 11b. The first braking member 25 is formed to be larger in diameter than the small-diameter portion 4d of the second flange portion 4c, which is a possible diameter for winding line onto the spool 4. The first braking member 25 is fixed to the end surface of the spool 4 by a plurality of screw members. The first braking member 25 is made of a heat-resistant synthetic resin, such as a fiber-reinforced resin in which, for example, woven cloth of carbon fiber is impregnated with a heat-resistant resin, such as phenol resin. The axially outward (the right side in FIG. 2) movement of the second braking member 26 is regulated by the reel body 1 via the pinion gear 61 and the axle bearing 20d.

The outside of the first and second braking members 25 and 26 is covered by a cover disc 28. The outer peripheral part of the cover disc 28 is fixed to the axially outward (the right side in FIG. 2) distal end portion of the large-diameter portion 4e of the second flange portion 4c. The cover disc 28 is fixed to the distal end portion of the large-diameter portion 4e of the second flange portion 4c by a screw member.

In a dual-bearing reel 100 configured in this manner, when fishing, the drag operating member 2 of the drag mechanism 6 is operated to the brake release position side, and the spool 4 is put in a freely rotatable state to cast fishing line. Accordingly, the spool 4 rotates in the line delivering direction due to the weight of the tackle, and the fishing line is released from the spool. At this time, since the first braking member 25 and the second braking member 26 are disengaged, the drive shaft 31 will not rotate in the line delivering direction. When the tackle hits water, one sets a desired drag force with the drag operating member 2 and waits for prey to bite the tackle. When prey bites the tackle and the prey pulls the fishing line with a force that is stronger than the set drag force, the drive shaft 31 rotates in the line delivering direction R2. Accordingly, the interlocking gear 72 is rotated in the line delivering direction, and the biasing member 78 biases the pawl member 66 from the disengaged position to the engagement position. With this, the pawl member 66 is in contact with the ratchet teeth 65a of the ratchet Wheel 65 and prevents the rotation of the ratchet wheel 65 in the line delivering direction R2. As a result, the drag mechanism 6 is actuated, and excessive force will not be applied to the fishing line. Here, in the pawl pivot controller 67 that is provided to the second one-way clutch 63, the pivoting of the pawl member 66 is controlled, not with a plate-like member, but with the interlocking gear 72 that rotates in response to the rotation of the drive shaft 31; therefore, deformation of the interlocking gear 72 for pivot control is less likely to occur, and it is possible to suppress the change in the frictional force that is generated by the deformation.

Other Embodiments

One embodiment of the present invention is described above, but the present invention is not limited to the above-described embodiment; various modifications can be made without departing from the scope of the invention. In particular, the various embodiments and modified examples described in the present Specification can be freely combined according to necessity.

In the above-described embodiment, the present invention is applied to a medium-sized lever drag-type dual-bearing reel; however, the present invention can be applied to all one-way clutches in which a ratchet wheel is mounted to the shaft end of the drive shaft of the dual-bearing reel. For example, the present invention can be applied to a pawl-type one-way clutch that is applied to a dual-bearing reel having a star drag mechanism, in which a drag mechanism is disposed in the periphery of the drive shaft.

(b) In the above-described embodiment, the rotation of the drive gear is directly transmitted to the interlocking gear 72, which is a first rotating member, but a separate rotating member can be disposed in between.

(c) In the above-described embodiment, the rotation of the drive shaft is transmitted to the interlocking gear, which is a first rotating member, via the drive gear, which is a second rotating member; however, the present invention is not limited to this configuration. For example, the rotation of the drive shaft can be directly transmitted to the first rotating member. For example, a rubber roller can be used as the first rotating member, and the rubber roller can be put in contact with the outer peripheral surface of the drive shaft, thereby transmitting the rotation of the drive shaft to the rubber roller.

(d) In the above-described embodiment, a drive gear is exemplified as the second rotating member, but the second rotating member according to the present invention is not limited to this configuration. For example, a second rotating member can be provided separate from the drive gear to the drive shaft or to a member that rotates in conjunction with the drive shaft. Additionally, in a lever drag-type dual-bearing reel, in the case that a ratchet wheel is provided integrally and rotatably to a drag disc or a spool shaft that rotates in conjunction with the drive shaft, the second rotating member can be integrally and rotatably provided to the drag disc or the spool shaft. In this case, the second rotating member is preferably a gear member that meshes with the first rotating member.

(e) In the above-described embodiment, a gear is exemplified as a first rotating member and a second rotating member, but the present invention is not limited to this configuration. The first rotating member and the second rotating member can be pulleys coupled by a belt or a friction wheel to which power is transmitted by friction.

In the above-described embodiment, the ratchet wheel 65 and the drive gear 60 are coupled with a coupling pin, but the drive gear 60 can be integrally and rotatably mounted to the drive shaft 31 without coupling. Also, when coupled, the drive gear can be configured so that the ratchet wheel 65 is rotatably mounted to the drive shaft 31 and so that the rotation from the drive gear 60 is transmitted.

(g) In the above-described embodiment, in order to reliably conduct the pivot control of the pawl member, the biasing member is disposed to be between the first rotating member and the pawl member; however, the present invention is not limited to this configuration. The first rotating member and the pawl member can be directly in contact, and the pawl member can be pivot controlled between the engagement position and the disengaged position by friction.

(h) In the above-described embodiment, a pawl cover 80 is mounted to the pawl member 66, and the biasing member 78 is engaged with the pawl cover 80; however, the present invention is not limited to this configuration. The biasing member can be configured to directly engage with the pawl member. In this case, for example, a recess or a protrusion that engages with the pivoting part of the biasing member can be disposed on the pawl member.

In the above-described embodiment, a cylindrical portion is formed on the first rotating member, and the pawl member is pivotally mounted on the pivot shaft via the cylindrical portion; however, the present invention is not limited to this configuration. The pawl member can be directly pivotally mounted on the pivot shaft.

<Characteristics>

The embodiment described above can be expressed as the following.

A dual-bearing reel 100 is a reel to unreel fishing line forward. The dual-bearing reel 100 comprises a handle 3, a reel body 1, a drive shaft 31, a ratchet wheel 65, a pawl member 66, a spool 4, and a pawl pivot controller 67. A pivot shaft 76 is disposed in the reel body 1, and a handle 3 is disposed to the side. The drive shaft 31 is rotatably mounted to the reel body 1 and is rotatable in conjunction with the handle 3. The ratchet wheel 65 comprises a plurality of ratchet teeth 65a that are disposed in the circumferential direction of the ratchet wheel 65 at intervals. The ratchet wheel 65 is rotatable in conjunction with the drive shaft 31. The pawl member 66 is pivotally disposed on the pivot shaft 76 between the engagement position where this member engages the ratchet teeth 65a and the disengaged position where this member is disengaged from the ratchet teeth 65a. The spool 4 is rotatable with respect to the reel body 1 and can wind the fishing line with the rotation of the drive shaft 31 in the line winding direction R1. The pawl pivot controller 67 is rotatably disposed on the pivot shaft 76, has an interlocking gear 72 that rotates in response to the rotation of the drive shaft 31, and pivots the pawl member 66 to the engagement position and the disengaged position in response to the rotational direction of the interlocking gear 72.

In this dual-bearing reel, when the drive shaft 31 rotates in the line winding direction R1, the interlocking gear 72 for pivot control of the pawl pivot controller 67 also rotates in the line winding direction R1. When the interlocking gear 72 rotates in the line winding direction R1, for example, the pawl member pivots to the disengaged position. Meanwhile, when the drive shaft rotates in the line delivering direction R2, the interlocking gear 72 also rotates in the line delivering direction R2. When the interlocking gear 72 rotates in the line delivering direction R2, for example, the pawl member 66 pivots to the engagement position. Accordingly, the rotation of the ratchet wheel in the line delivering direction R2 is prevented, and the rotation of the drive shaft 31 in the line delivering direction R2 is also prevented. As a result, the drag mechanism can be operated. In this embodiment, the pivoting of the pawl member 66 is controlled, not with a plate-like member, but with the interlocking gear 72 that rotates in response to the rotation of the drive shaft 31; therefore, deformation of the interlocking gear 72 for pivot control is less likely to occur, and it is possible to suppress the change in the frictional force that is generated by the deformation.

(B) The pawl pivot controller 67 can further comprise a drive gear 60 that can rotate in conjunction with the drive shaft 31. The interlocking gear 72 rotates in conjunction with the rotation of the drive gear 60. In this configuration, since the rotation of the drive shaft 31 can be transmitted to the interlocking gear 72 via the drive gear 60, the interlocking gear 72 can be rotated in conjunction with the drive shaft 31 regardless of where the ratchet wheel 65 is disposed in the dual-bearing reel 100.

(C) The drive gear 60, which is a second rotating member, can be disposed on the drive shaft 31. In the configuration in which the ratchet wheel 65 is disposed on the drive shaft 31, the rotation of the drive shaft 31 can be easily transmitted to the interlocking gear 72. Additionally, the interlocking gear 72 can be disposed without being limited by the size or the positional relationship of the ratchet wheel 65 and the drive gear 60 that transmits the rotation of the drive shaft 31 to the spool 4.

(D) The second rotating member can be a drive gear at is disposed on the drive shaft 31 for transmitting the rotation of the handle 3 to the spool 4. In this configuration, since the second rotating member for transmitting the rotation of the drive shaft 31 to the interlocking gear 72 can also be used as the drive gear, the configuration of the pawl pivot controller 67 can be simplified.

(E) The pawl pivot controller 67 can further comprise a biasing member 78 that biases the pawl member 66 to the engagement position and the disengaged position according to the rotational direction of the first rotating member 72. In this configuration, the interlocking gear 72 does not directly control the pivoting of the pawl member 66, but the interlocking gear 72 controls the pivoting of the pawl member 66 via the biasing member 78, so that the pivoting of the pawl member 66 can be accurately controlled.

(F) The biasing member 78 comprises a frictional engagement portion 78*a* that frictionally engages the interlocking gear 72, as well as the pivoting part 78*b* that can integrally pivot the pawl member 66. In this configuration, since the biasing member 78 comprises a friction engagement portion 78*a* and a pivoting part 78*b*, the pivoting of the pawl member 66 can be more accurately controlled with the biasing member 78.

(G) The interlocking gear 72 can comprise a cylindrical portion 72*b* that is disposed around the pivot shaft 76 in a cylindrical shape and to which the biasing member 78 is mounted. In this configuration, since the pawl member 66 is mounted on the pivot shaft 76 via the interlocking gear 72, the contact surface between the pawl member 66 and the interlocking gear 72 is large, and the pawl member 66 can be more easily pivoted according to the rotation of the interlocking gear 72.

(H) The friction engagement portion 78*a* of the biasing member 78 can comprise an arcuate part 78*c* that is frictionally engaged with and mounted to the cylindrical portion 72*b*, and the pivoting part 78*b* of the biasing member 78 can comprise an extended section 78*d* that extends from the end of the arcuate part 78*c* to the pawl member 66. In this configuration, frictional engagement between the arcuate part 78*c* and the interlocking gear 72 can occur, and the pivoting of the pawl member 66 can be controlled with the extended section 78*d*.

The cylindrical portion 72*b* can comprise a retaining recess 72*d* that retains the biasing member 78 in the circumference thereof. In this configuration, since the biasing member 78 can be retained in the retaining recess 72*d* of the interlocking gear 72, the biasing member 78 can be more easily pivoted according to the rotation of the interlocking gear 72.

(J) The pawl pivot controller 67 further comprises a pawl cover 80 that is integrally and pivotally provided to the pawl member 66 and that engages the extended section 78*d*. In this configuration, since the pawl member 66 can be pivoted with the extended section 78*d* of the biasing member 78 via the pawl cover 80, the pawl member 66 can be more reliably pivoted in response to the rotation of the interlocking gear 72.

(K) The pawl cover 80 comprises a mounting portion 80*a* that is pivotal by the pivot shaft 76, an engagement portion 80*b* that integrally and pivotally engages with the pawl member 66, and an engagement groove 80*c* that engages the extended section 78*d*. In this configuration, since the engagement portion 80*b* engages the pawl member 66, and since the extended section 78*d* of the biasing member 78 engages the engagement groove 80*c*, the pivoting of the biasing member 78 can be reliably transmitted to the pawl member 66.

(L) The mounting portion 80*a* can be mounted on the outer peripheral side of the arcuate part 78*c* in the cylindrical portion 72*b*, and the engagement portion 80*b* can extend along the pawl member 66 from the mounting portion 80*a* and can comprise a pair of engagement pieces 80*d* that engage the side surfaces of the pawl member 66. The engagement groove 80*c* is formed on the engagement portion 80*b* along the pawl member 66, and an extended section 78*d* is disposed therein. In this configuration, since the pawl member 66 is sandwiched by the engagement pieces 80*d* and the extended section 78*d* is disposed in the engagement groove 80*c*, when the extended section 78*d* is pivoted, this section will pivot the pawl cover 80 via the engagement groove 80*c* and will also pivot the pawl member 66 via the engagement portion 80*b*. For this reason, the pawl member 66 can be more reliably pivoted with the pivoting of the biasing member 78.

(M) The interlocking gear 72 can be a gear member that meshes with the drive gear 60. In this configuration, since the interlocking gear 72 is a gear member, the interlocking gear 72 will not slide with respect to the drive gear 60 and will instantaneously interlock with respect to the rotation of the drive gear 60.

What is claimed is:

1. A dual-bearing reel for forwardly casting a fishing line, comprising:
    a handle;
    a pivot shaft;
    a reel body having the pivot shaft disposed therein and the handle disposed to a side thereof;
    a drive shaft rotatably mounted to the reel body and being rotatable in conjunction with the handle;
    a ratchet wheel comprising a plurality of ratchet teeth disposed in a circumferential direction at intervals and being rotatable in conjunction with the drive shaft;
    a pawl member pivotally disposed on the pivot shaft between an engagement position in which the pawl member engages the ratchet teeth and a disengaged position in which the pawl member disengages the ratchet teeth;
    a spool rotatable with respect to the reel body and being configured to wind the fishing line with a rotation of the drive shaft in a line winding direction; and
    a pawl pivot controller at least partially rotatably disposed on the pivot shaft, having a first rotating member configured to rotate in response to the rotation of the drive shaft, and being configured to pivot the pawl member to the engagement position and the disengaged position in response to rotation of the first rotating member.

2. The dual-bearing reel recited in claim 1, wherein
    the pawl pivot controller further comprises a second rotating member configured to rotate in conjunction with the drive shaft, and
    the first rotating member rotates in conjunction with the rotation of the second rotating member.

3. The dual-bearing reel recited in claim 2, wherein
    the second rotating member is disposed on the drive shaft.

4. The dual-bearing reel recited in claim 3, wherein
    the second rotating member is a drive gear disposed on the drive shaft for transmitting the rotation of the handle to the spool.

5. The dual-bearing reel recited in claim 4, wherein
    the first rotating member is a gear member configured to mesh with the drive gear.

6. The dual-bearing reel recited in claim 1, wherein
    the pawl pivot controller further comprises a biasing member configured to bias the pawl member to the engagement position and the disengaged position based on the rotation of the first rotating member.

7. The dual-bearing reel recited in claim 6, wherein
the biasing member comprises,
a frictional engagement portion that frictionally engages with the first rotating member, and
a pivoting part configured to integrally pivot the pawl member.

8. The dual-bearing reel recited in claim 7, wherein
the first rotating member comprises a cylindrical portion that is disposed around the pivot shaft in a cylindrical shape and to which the pawl member is pivotally mounted.

9. The dual-bearing reel recited in claim 8, wherein
the frictional engagement portion of the biasing member comprises an arcuate part that is frictionally engaged with and mounted on the cylindrical portion, and
the pivoting part of the biasing member comprises an extended section that extends from an end of the arcuate part to the pawl member.

10. The dual-bearing reel recited in claim 9, wherein
the cylindrical portion comprises a retaining recess configured to retain the biasing member in a circumference thereof.

11. The dual-bearing reel recited in claim 8, wherein
the pawl pivot controller further comprises an engagement member integrally and pivotally disposed on the pawl member and being configured to engage the extended section.

12. The dual-bearing reel recited in claim 11, wherein
the engagement member comprises,
a mounting portion that is pivotal by the pivot shaft,
an engagement portion that integrally and pivotally engages the pawl member, and
an engagement groove engages the extended section.

13. The dual-bearing reel recited in claim 12, wherein
the mounting portion is mounted on an outer peripheral side of an arcuate part in the cylindrical portion,
the engagement portion extends along the pawl member from the mounting portion and comprises a pair of engagement pieces engaging side surfaces of the pawl member, and
the engagement groove is disposed on the engagement portion along the pawl member, and the extended section is disposed therein.

* * * * *